Jan. 27, 1931.  M. CHEVALLIER ET AL  1,790,534
VALVELESS INTERNAL COMBUSTION ENGINE
Filed July 25, 1929  4 Sheets-Sheet 3

INVENTORS
Marcel Chevallier
Gaston Poulain
By Robb+Robb
Attorneys

Patented Jan. 27, 1931

1,790,534

UNITED STATES PATENT OFFICE

MARCEL CHEVALLIER, OF MARNES LA COQUETTE, AND GASTON POULAIN, OF DRANCY, FRANCE

VALVELESS INTERNAL-COMBUSTION ENGINE

Application filed July 25, 1929, Serial No. 381,060, and in France July 26, 1928.

Internal combustion engines used at present for various actuation purposes such for instance as the actuation of aeroplanes, automobiles, motor bicycles, etc. have a fairly low efficiency and they unnecessarily waste a considerable amount of the energy produced by the explosions of the combustible mixture.

This is mostly due to the large number of their operative parts which produce an unduly large quantity of frictional or inertia stresses and to an incomplete utilization of the relief or working stroke, owing to the fact that the very shape of internal combustion engines of the usual type fitted with individual cylinders having separate pistons and connecting rods precludes the rational lengthening of said stroke to fully utilize the latter, it being obvious that exhaust gases still contain energy which ought to be made use of to increase the efficiency of the engine.

Moreover the delivery of the explosive mixture through poppet valves absorbs a good amount of energy for compressing the springs, the latter being the stronger as the rotational speed of the engine is larger. The substitution of sleeve valves for common poppet valves which has frequently been proposed does not either solve the problem owing to the concomitant weight increase and lubrication requirements.

Now, it is the primary object of the present invention to solve the aforesaid problem by the provision of a valveless toric internal combustion engine of improved and simplified structure comprising a minimum number of parts, requiring a minimum lubrication, involving no reciprocating motions and utilizing diametrically connected and balanced pistons actuated pairwise and sequentially through a toric explosion chamber without undergoing bias stresses.

A further object of the invention is the provision of a valveless toric internal combustion engine wherein the centrifugal strength exerted on the diametrically arranged and balanced pistons is substantially neutralized whereby the piston rings freely expand thus obviating the necessity of ova- grinding of the explosion chamber while ensuring a perfect tightness and a minimum friction.

A still further object of the invention is the provision of a valveless toric internal combustion engine wherein the explosion cycle comprises ten explosions for three full revolutions of the engine shaft, thus angularly separating the bottom of each successive explosion capacity or chamber portion to the extent of 36° whereby the full volume of the explosion chamber is sequentially and evenly utilized which prevents undue heating while facilitating lubrication, improving carburation and precluding any premature flash of the explosive mixture.

A still further object of the invention is the provision of a toric internal combustion engine of the valveless type wherein the delivery of the explosive mixture takes place in a direction reverse to that of the rotation of the engine thereby doing away with the intake and exhaust manifolds and simplifying the structure while reducing machining costs to a minimum, the delivery being performed automatically.

A still further object of the invention is the provision of a valveless toric internal combustion engine whose direction of rotation may be easily changed merely by reversing the positions of the pistons in the explosion chamber and gear members associated with said pistons.

Yet another object of the invention is the provision of a valveless toric internal combustion engine that may be duplicated or more generally coupled to similar motive elements to build up a composite engine.

The invention comprises the elements and combinations of elements, features of construction and operation, arrangements of parts, steps and sequences of steps which are exemplified in the structure hereinafter described and the scope or application of which will be indicated in the following claims.

In the accompanying drawings in which is illustrated a preferred mechanical embodiment of the invention:—

Figure 1:
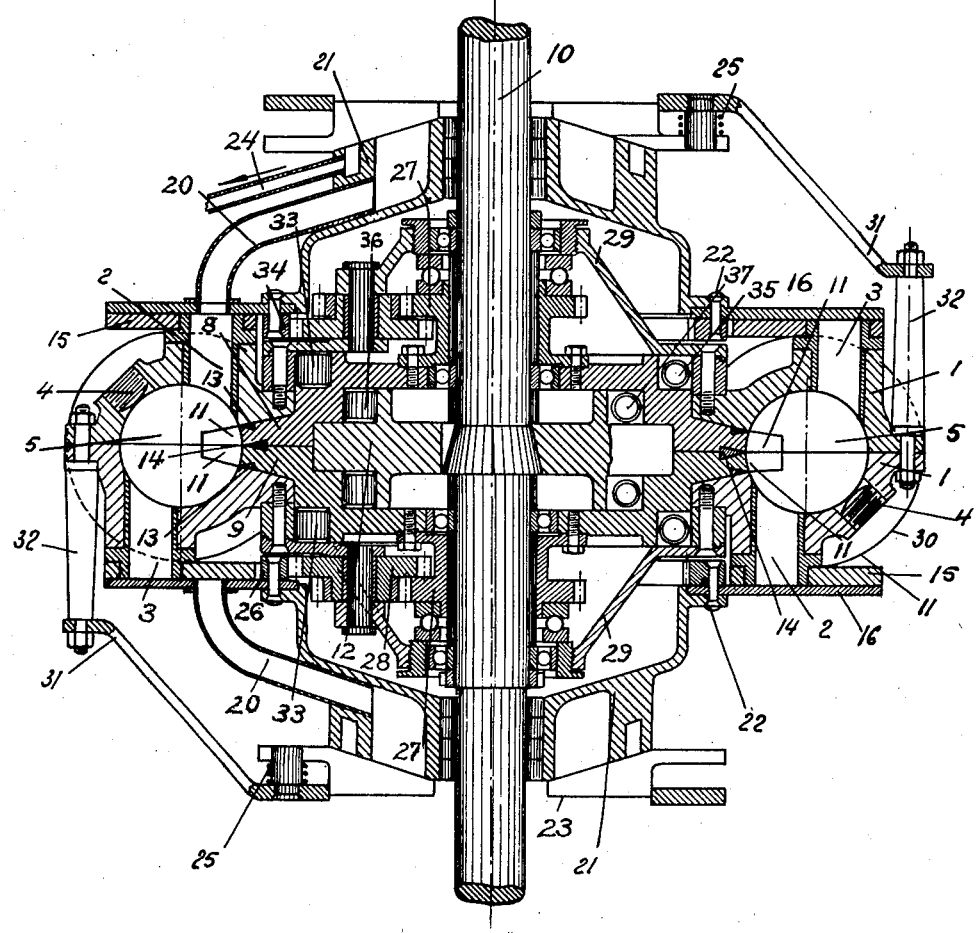
Figure 1 is an axial sectional view through the engine showing the mutual arrangement of its several parts, the engine shaft being shown in elevation and partly broken away.

As illustrated, the engine comprises a casing built up of two juxtaposed symmetrical shells 1, 1 advantageously made of suitably treated alloy steel which are assembled together in centered relationship. Each shell 1 is formed in its peripheral region with five inlet ports 2, five outlet ports 3 and five tapped holes 4 adapted to hold the sparking plugs (not shown) the outlet ports 3 being closer to the periphery of the shells than the inlet ports 2.

Each shell 1 is formed adjacent its periphery with a semi-circular recess; and recesses formed in both shells registering when the latter are centered together to provide a continuous toric chamber 5 i. e. an annular chamber having the shape of a torus, the inlet ports 2 and outlet ports 3 freely opening into said chamber.

In the toric chamber 5 can angularly move two pairs of diametrically opposed pistons 6, advantageously made of duralumin or other suitable alloy, preferably light and strong, fitted with piston rings 7 of usual shape, each of said pistons presenting in section the general shape of the letter I.

The pistons 6 are diametrically connected pairwise to two circular plates 8, 9 also advantageously made of treated alloy steel, centered upon the engine shaft 10, the latter being straight that is to say non-cranked.

The plates 8, 9 are adapted to replace the connecting rods of usual internal combustion engines. In other words, they transmit the impulse of the pistons 6 which are slid into engagement with a pair of tenons 11, 11 fitted on said plates owing to the action of a set of clutch members arranged in the inner part of the engine as will be described hereinafter, said clutch members being adapted to permit the plates 8, 9 to angularly move at unequal speeds for the purpose of defining i. e. limiting the several explosion capacities or compartments of the toric chamber 5 throughout the operative cycle of the engine. As will also be described hereafter, a set of ratchet members fitted on each plate 8 or 9 prevents any backward rotation thereof.

The impulse is transmitted through a central ring 12 located between the plates 8 and 9, keyed upon the shaft 10 and so associated with said plates as to be alternatively driven by the one or the other.

Triangular packing rings 13, 13, 14 are provided in recesses formed on the plates 8, 9 for preventing any leakage of oil or explosive mixture while being capable of readily taking up wear or play.

The intake and exhaust are performed by means of a pair of stationary holding plates 15, 15 and a pair of rotatable ported plates 16, 16 advantageously mounted on ball bearings for reducing friction and centered on the shaft 10. Each ported plate 16 is formed with an elongated inlet port 17, an elongated outlet port 18 and an elongated starting port 19, as will be described hereafter. Each inlet port 17 is connected with the carburetter (not shown) which may be of any conventional structure through a pipe 20 communicating with a rotary housing 21 secured to the rotatable ported plate 16 by bolts 22. This housing communicates in turn with the carburetter through a conical union 23 which supports it and also supports a pipe 24 for feeding the compressed fluid supplied by the starter (not shown) the latter being for example a manually operated pump.

Coil springs 25 abutting against the conical union 23 provide a perfect fitting and adherence of the aforesaid parts.

Each rotatable ported plate 16 and housing 21 are driven by an innerly toothed ring 26 bolted to the plate 16, through a driving pinion 27 mounted upon the plate 8 or 9 and an intermediate pinion 28 mounted upon a centering spider 29 and meshing with said toothed ring 26, a reducing ratio of 33% (1 : 3) being provided between the pinion 27 and ring 26 which rotate in reverse directions as will be readily seen.

Sparking plugs of conventional type (not shown) are threaded into the tapped holes 4 formed in the shells 1, 1. The proper timing of the ignition is provided for by any usual or preferred device.

The lubrication of the toric chamber 5 is advantageously effected by a mixture of oil and gasoline while the internal parts are splash lubricated, no oil pump being thus required.

Cooling of the engine is effected by means of a jacket 30 housing the two shells 1, 1, inlet and outlet ports (not shown) being provided for the cooling fluid so as to equalize the temperature. Cooling may also, or additionally, be effected by any other well known means 1, 1 as will be readily appreciated by anyone skilled in the art.

As above stated, a starter comprising a manually operated pump is provided for forcing a starting fluid through the two tubes 24 in the direction disclosed by the arrow, only one of these tubes being visible in the drawings. This starter is of conventional type both in construction and operation, forms no part of the invention and need not be described.

Spiders 31 connected to columns 32 bolted to the peripheral flanges of the juxtaposed shells 1, 1 support the manifold union 23.

The operation of the engine is as follows, reference being particularly had to Fig. 4 wherein are shown the ten positions of the pairs of pistons corresponding to the ten successive ignitions in the compartments defined in the toric chamber 5 by said pistons, the letters S, C, R and E respectively meaning suction, compression, relief and exhaust i. e. designating the four strokes for each of the ten positions. As will be seen, two pairs of pistons delineate between them two angles of 36° and two angles of 144°, one compartment angularly equal to 36° corresponding to relief (working stroke proper) the next one angularly equal to 144° corresponding to exhaust, the next one angularly equal to 36° corresponding to suction and the next one angularly equal to 144° corresponding to compression.

Figure 4:
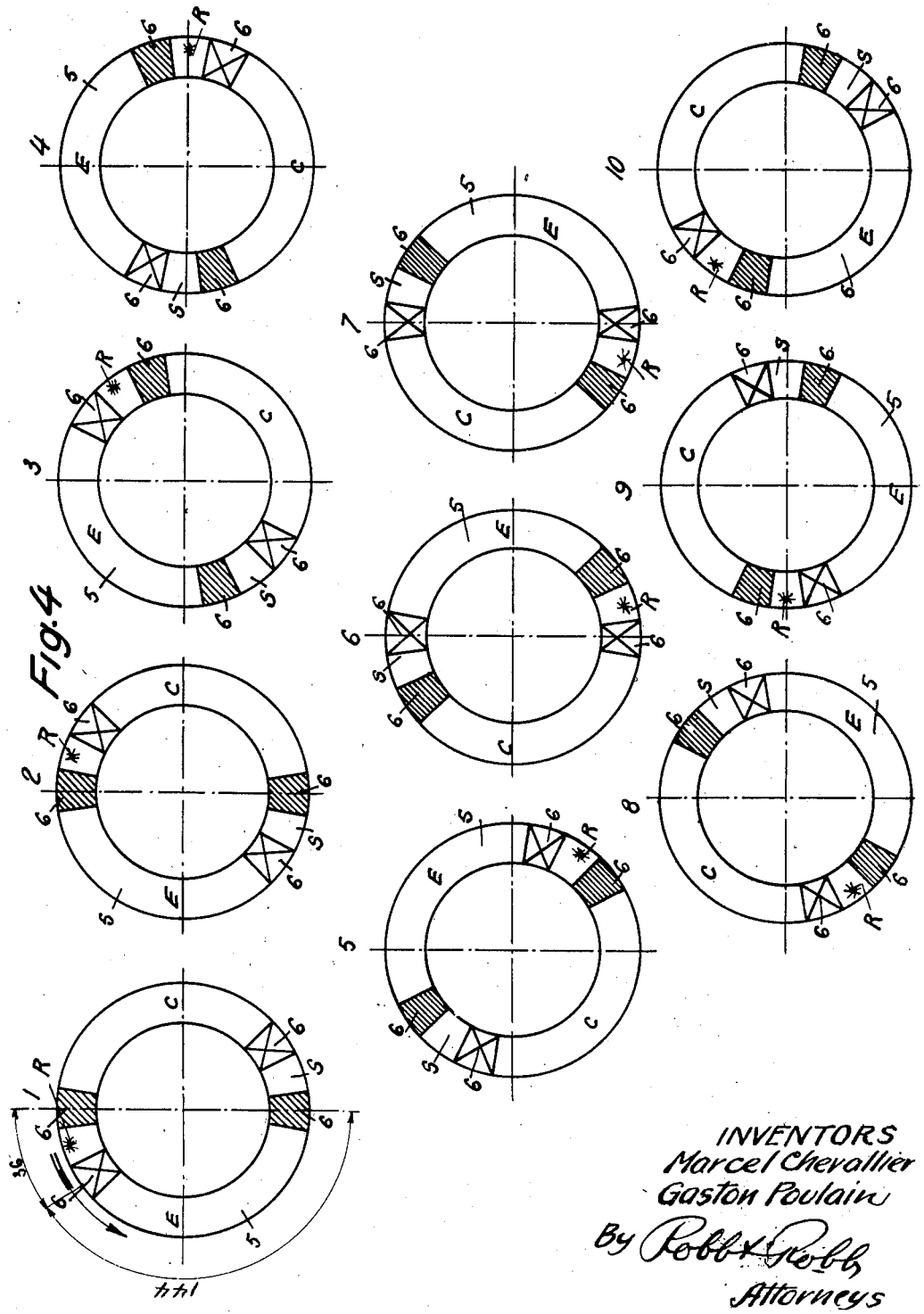
Figure 4 is a diagrammatic view showing in ten diagrams the ten positions successively occupied in the toric chamber of the engine by the two pairs of diametrically connected pistons clearly setting forth how the complete operative cycle of the engine proceeds over three full revolutions of the shaft.

In the first diagram of Fig. 4, the pair of pistons bearing cross-hatchings are held stationary by the ratchet means, as above referred to, said ratchet means comprising rollers 33 each engaging a slanting path 34 and subjected to the action of a spring push rod 35 (see Fig. 2) housed in recesses formed in the plates 8, 9. While the pair of these pistons is thus held stationary, the other pair of pistons bearing diagonal lines is angularly moved anti-clockwise by the explosion of the mixture ignited by the sparking plug.

The next position of the pistons is shown in the second diagram of Fig. 4 which discloses that the pair of pistons bearing diagonal lines is held stationary by the ratchet means as aforesaid while the pair of pistons bearing the cross hatchings is angularly moved by the explosion of the mixture, the cyclic process being thus repeated throughout the ten positions illustrated in the ten diagrams of Fig. 4 which clearly shows that the engine shaft 10 must rotate three times before one pair of pistons resumes its angular position as shown by the first diagram.

It will thus be understood that the toric chamber 5 is theoretically divided into ten compartments corresponding to the five double inlet ports and the five double outlet ports, ten strokes of each character: suction, compression, relief and exhaust being thus effected for three revolutions of the engine shaft 10.

The timing of the intake through the inlet pipes 20 fed by the carburetter is of course correspondingly adjusted.

Figure 2:
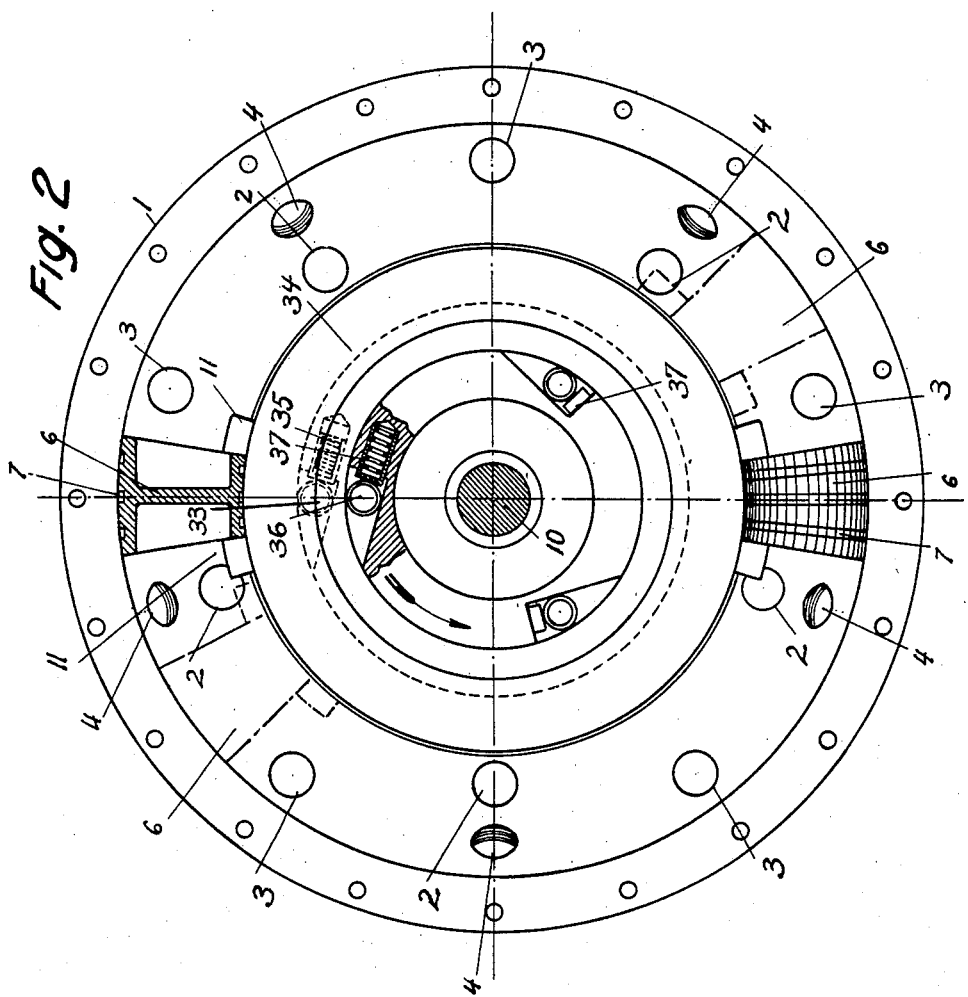
Figure 2 is an elevational view partly in section of one part of engine casing.
Figure 3:
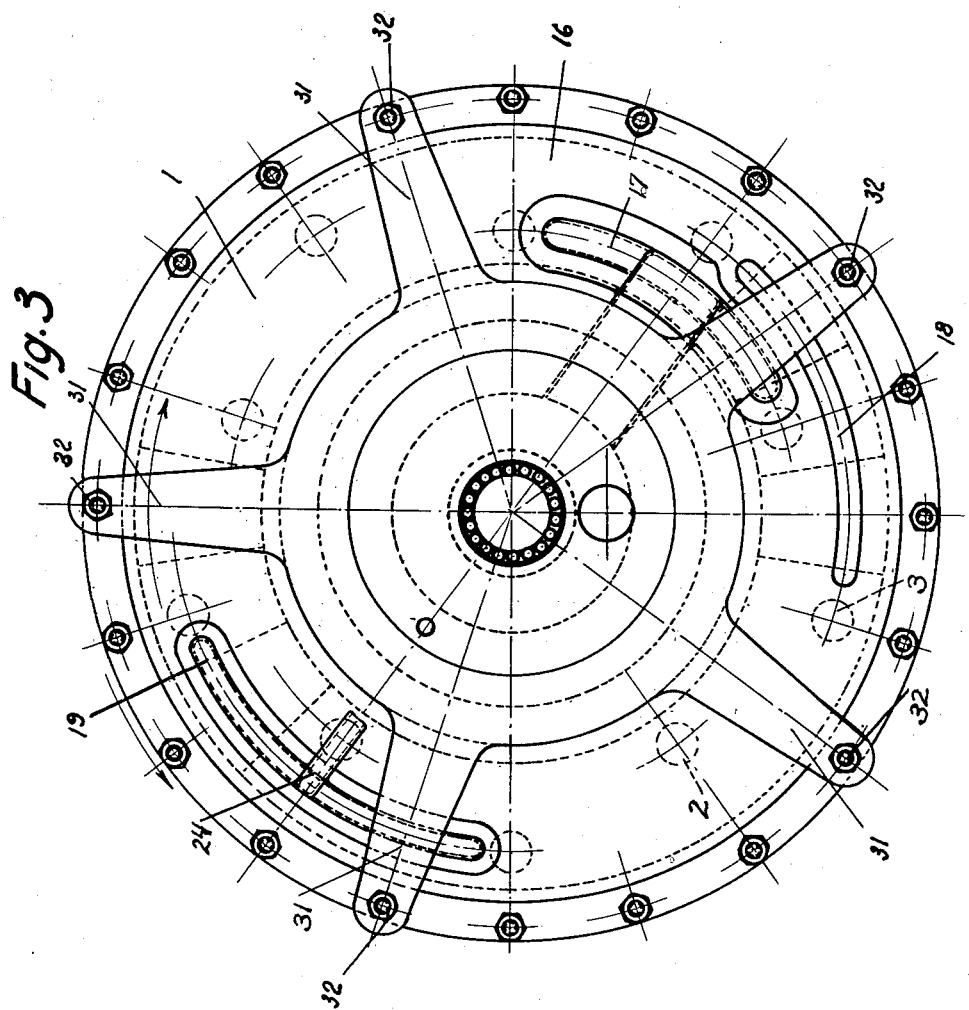
Figure 3 is an elevational view of another part of the engine casing.

The driving of the central ring 12 and shaft 10 is performed by the clutch means as above described, said clutch means comprising a plurality of rollers 36 (for example six) each pressed on a slanting path formed on the plates 8, 9 by a spring push rod 37 housed in recesses formed in said central ring 12 (see Fig. 2).

It will be appreciated that the ratchet means comprising the outer rollers 33 and the clutch means comprising the inner rollers 36 operate after the fashion of two oppositely working free wheel clutches as the ones associated with the rear wheel hub of bicycles since they rotate in reverse directions and work alternatively, to wit: the outer ratchet rollers 33 preventing any reverse rotation of the plates 8 and 9 during the relief or working stroke of the released pistons whereas the inner clutch rollers 36 transmit the angular motion of the plates 8 and 9 to the central ring 12 during said relief stroke.

The rollers of the ratchet and clutch means respectively work alternatively. Thus for example, reference being had to the first diagram of Fig. 4, the clutch rollers 36 (inner rollers) in one side portion of the engine are jammed so as to transmit the impulse of the two released pistons to the central ring 12 while simultaneously the ratchet rollers 33 (outer rollers) in the opposite side portion of the engine are jammed so as to form abutments for the plate (8 or 9) located on the same side, the other pair of pistons being thus held stationary owing to the position of the tenons 11 in the corresponding mortises formed in said pistons.

It is believed that with the foregoing explanations anyone skilled in the art will properly understand the structure and operation of the engine.

Numerous minor constructional details might of course be changed without departing from the spirit of the invention.

What we claim is:—

1. A valveless internal combustion engine comprising, in combination, a casing delineating a toric chamber and having inlet ports, outlet ports and sparking plug receiving holes opening into said chamber, four pistons diametrically connected to one another pairwise and slidably housed in said toric chamber, a central shaft, a ring concentrically keyed upon said shaft, a pair of juxtaposed driving plates encompassing said ring and having projections protruding into the toric chamber for engaging the pistons, rotatable plates having ports adapted to timely register with the inlet and outlet ports, a gear actuating said rotatable plates, roller clutch means for transmitting the impulse of the pair of released pistons to the central ring, and roller ratchet means for providing abutments against which the other pair of pistons is simultaneously held stationary.

2. A valveless internal combustion engine comprising, in combination, a casing formed of centered and juxtaposed shells formed to delineate a toric chamber and having inlet ports, outlet ports and sparking plugs receiving holes opening into said chamber, four internally mortised pistons diametrically connected to another pairwise and slidably housed in said toric chamber, a central shaft, a ring concentrically keyed upon said shaft, a pair of juxtaposed driving plates encompassing said ring and having peripheral tenons projecting into the toric chamber for engaging the piston mortises, rotatable plates having elongated ports adapted to timely register with the inlet ports and outlet ports respectively, a reducing gear actuating said rotatable plates, inner clutch rollers engaging slanting paths formed in the driving plates, spring push rods housed in recesses formed in the central ring and forcing said rollers into engagement with said paths for transmitting the impulse of the pair of released pistons to the central ring and shaft, outer ratchet rollers engaging slanting paths formed in said first-named driving plates, and spring push rods housed in recesses formed in said plates for forcing said ratchet rollers against said latter paths and thus providing abutments against which the other pair of pistons is simultaneously held stationary, the ratchet rollers and clutch rollers working alternatively.

3. A valveless internal combustion engine comprising, in combination, a casing formed of two centered and juxtaposed shells having peripheral flanges bolted to each other and hollowed to delineate a continuous toric chamber, inlet ports, outlet ports and sparking plug receiving holes formed in said shells opening into said chamber, four internally mortised pistons diametrically connected to one another pairwise and slidably housed in said toric chamber, a central shaft, a driving ring concentrically keyed upon said shaft, a pair of peripherally juxtaposed driving plates centrally hollowed for snugly encompassing said ring and having peripheral tenons projecting into the toric chamber for engaging the piston mortises, a pair of rotatable plates having elongated ports adapted to register with the inlet and outlet ports respectively, intake and exhaust pipes connected with said respective ports, a pair of oppositely disposed symmetrical housings rotatably mounted upon the shaft and connected with the respective pipes and with the fuel supply, a pair of spiders bolted to the flanges of the shells, a pair of unions elastically supported by said spiders upon the rotatable housings, a pair of gears each having one toothed element fixed to one driving plate and another toothed element fixed to one housing, said gears being adapted to timely actuate the respective rotatable ported plates, inner clutch rollers engaging slanting paths formed in the driving plates, spring push rods housed in recesses formed in the central ring and forcing said rollers into engagement with said paths for transmitting the impulse of the pair of released pistons to the central ring and shaft, outer ratchet rollers engaging slanting paths formed in said first-named driving plates, and spring push rods housed in recesses formed in said plates for forcing said ratchet rollers against said latter paths and thus providing abutments against which the other pair of pistons is simultaneously held stationary, the ratchet rollers and clutch rollers working alternatively.

In testimony whereof we affix our signatures.

MARCEL CHEVALLIER.
GASTON POULAIN.